Dec. 9, 1924.          1,518,211
H. P. MAUE
ELECTRICAL DEVICE FOR MEASURING THE CONDUCTIVITY OF THE STOMACH CONTENTS
Filed Feb. 23, 1923
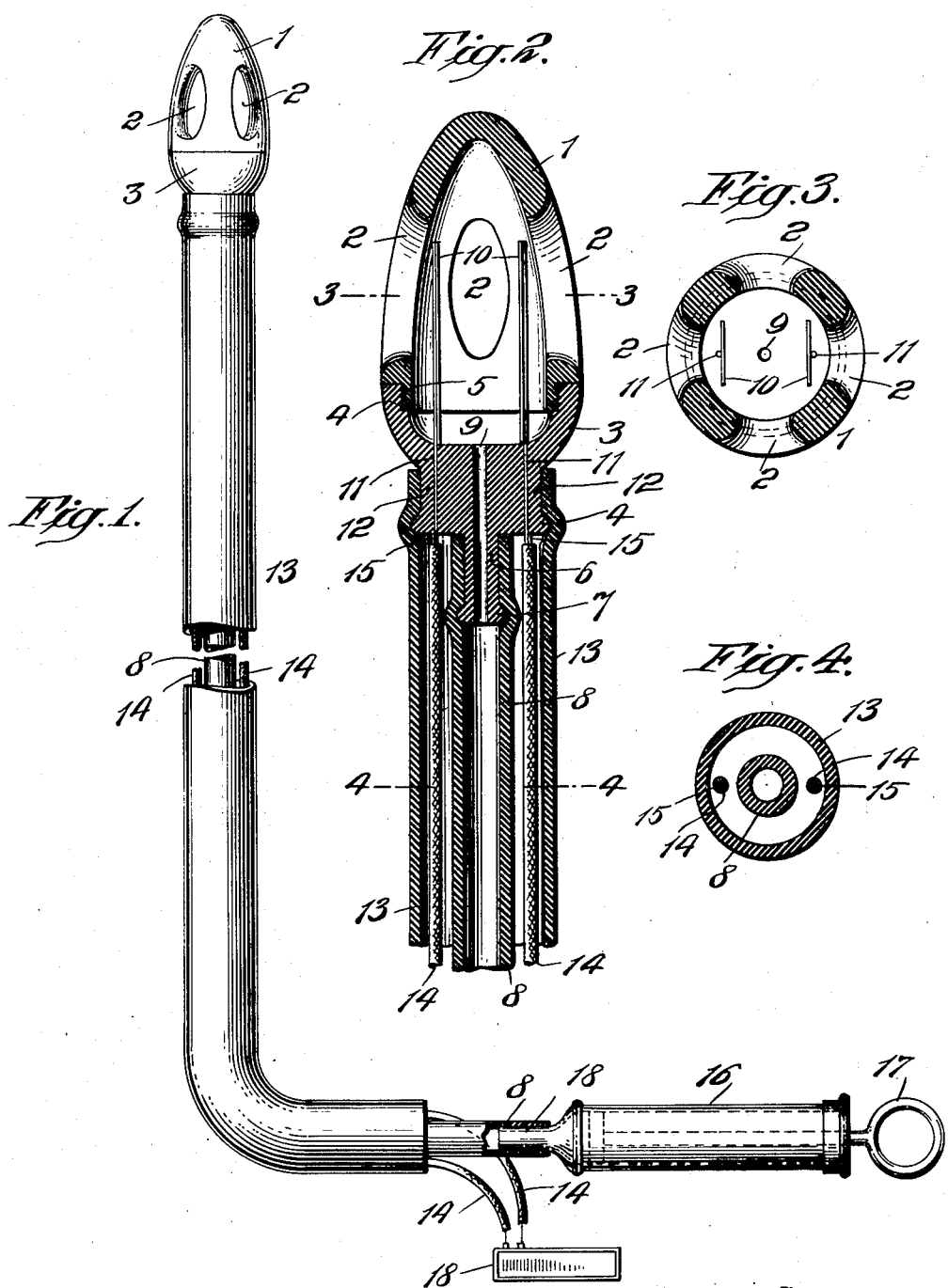

Patented Dec. 9, 1924.

1,518,211

UNITED STATES PATENT OFFICE.

HENRY PETER MAUE, OF NEW YORK, N. Y.

ELECTRICAL DEVICE FOR MEASURING THE CONDUCTIVITY OF THE STOMACH CONTENTS.

Application filed February 23, 1923. Serial No. 620,717.

*To all whom it may concern:*

Be it known that I, HENRY PETER MAUE, a citizen of the United States, and resident of borough of the Bronx, New York city, in the county of Bronx and State of New York, have invented certain new and useful Improvements in Electrical Devices for Measuring the Conductivity of the Stomach Contents, of which the following is a specification, reference being had therein to the accompanying drawing.

This invention relates to an electrical device or apparatus for measuring the conductivity of the contents of the stomach in the practice of medicine when it is desired to test for acidity or other purposes.

Heretofore it has been customary in the determination of the diseased condition of the stomach to remove a portion of the fluid contents through a stomach tube or other medical appliance and subject the same to chemical tests to ascertain the acidity and other characteristics, but this detachment of a part of the contents from the remainder and its removal from the conditions surrounding the fluid when in its natural repository in the stomach is not attended with as good results as if such contents could be subjected to electrical treatment while in the stomach itself. The object of my invention is therefore to furnish electrical mechanism for measuring or testing the conductivity of the electrolyte in the stomach and arranging the same so as to give results which can be read off directly in ohms or otherwise from a scale.

The invention may therefore be said to consist broadly in the combination with a stomach tube or pump of electrical means so arranged in the member that is introduced into the stomach and which becomes filled with the electrolyte that the electrical resistance of the electrolyte may be accurately measured, without removing the electrolyte from the stomach; and also the invention may be said to include various details and peculiarities in the construction, arrangement and combination of parts, substantially as will be hereinafter described and claimed.

In the accompanying drawing illustrating my invention;

Figure 1 is a side elevation of my improved electrical device for testing the stomach contents.

Figure 2 is an enlarged longitudinal section of the receiving nozzle or casing that is introduced into the stomach through the gullet and the tubes and electrical devices appurtenant to the said nozzle or casing.

Figure 3 is a cross section on the line 3, 3, of Figure 2.

Figure 4 is a cross section on the line 4, 4, of Figure 2.

Similar characters of reference designate corresponding parts throughout the different figures of the drawing.

The essential idea of the invention is to combine an electrical measuring means with a stomach pump or suction appliance, the latter receiving and holding a portion of the contents of the stomach and supporting the members of the electrical device within the stomach so that an electric current may be made to pass through the stomach contents so held and the conductivity thereof be measured and easily read on a scale.

To this end I provide a stomach pump, tube, or similar instrument, having a nozzle member 1 that is insertable into the stomach, and attached thereto is a tube 8, carrying at its outer end a syringe 16. When the nozzle 1 has been inserted into the stomach through the mouth and gullet by means of the flexible tube 8, the contents of the stomach will quickly enter and fill the interior casing or chamber in nozzle 1 through the lateral openings or windows 2 with which nozzle 1 is provided, of which there may be any number of any size. The outer end of tube 8 is connected to the tubular end 18 of the syringe 16, whose handle 17 is designed to operate a piston within the syringe barrel. By means of this syringe a suction effect can be produced in tube 8 to draw the fluid in the stomach through the openings 2. Obviously the syringe 16 is simply one example of the device, and any other vacuum or suction device may be used.

The shape, size and proportions of nozzle 1 may vary greatly. It may partake of an oval or egg-shape as shown, and is preferably made in two parts, in order to allow the electrical devices to be arranged therein, the perforated or slotted bulb member 1 having a screw-threaded flange 5 that screws into the internally-screw-threaded shoulder 4 on the inside of the cup member 3 which has a neck 12, on the lower end of which is a spindle or pin 6, through which, as also through the cup member 3, runs a central passage 9, which connects the interior of the nozzle 1 with the tube 8, the end of the latter being connected with the spindle 6 by being stretched over the peripheral bead 7 on the end of said spindle. Hard rubber is a preferable material out of which to form the nozzle, though I am not confined thereto; and in fact any receptacle on the inner end of the tube 8 to receive the stomach contents and hold the same while being electrically tested as to their resistance would satisfy the invention, provided the structure of the same permits the proper use of electrical wiring, poles or anodes and cathodes, and the like or similar paraphernalia for passing the electric current.

To illustrate a form of electrical means I locate within the nozzle or casing 1 a pair of plates 10, 10, preferably of platinum, one an anode and the other a cathode, being a suitable distance apart and submerged in the fluid electrolyte which enters through the side openings or perforations 2 from the interior of the stomach. These plates 10 are supported on the cup section 3 by means of the wires 11, 11, that are secured to plates 10 and run through the neck 12 of body 3, projecting through the lower end of same and there being secured by soldering or fusing with the wires 15, 15, that are rubberized or covered with any suitable insulating tubes 14. These insulated wires run alongside of tube 8 to the end thereof and are covered by an outer tube 13 which is connected to the nozzle by being stretched over the peripheral bead on the neck 12, said tube protecting the wires 14, so that they are conveniently taken care of between tubes 8 and 13. Wires 15 may be copper, or other suitable metal; wires 11 may be platinum or other suitable metal.

These wires 15 which serve as conductors carry the electric current to the poles or plates 10 and when the circuit is closed and the poles are energized the gap between them is bridged by the current and the conductivity of the electrolyte may be determined. Some suitable device will be utilized at 18 for example, where I show in conventional outline an example of device, such as an ohmmeter, a Wheatstone bridge, or other equivalent instrument, having a scale to read in ohms, or other equivalent reading table, with all necessary battery circuits, etc. It is unnecessary to explain any of these instruments in detail, as I can utilize the one that seems most adaptable to measure the resistance of electrolytes.

The operation will be readily understood from the foregoing description of the construction and combination of parts, without the necessity of further description. The advantages of testing the resistance of the stomach contents while they are still in the stomach are apparent. It will be understood moreover that many changes in the parts and their relation to each other may be made within the scope of the claims.

Having thus described my invention, what I claim as new and desire to secure by Letters Patent, is:

1. In a device of the class described, the combination with an electrolyte holder adapted for introduction into a bodily organ, a tube attached thereto enabling a suction to be created in said holder to draw in the electrolyte, metallic members located in the holder, and means for passing an electric current through said members to measure the resistance of the electrolyte, when it is drawn into said holder.

2. In a device of the class described, the combination with an electrolyte holder adapted for introduction into a bodily organ, a tube attached thereto for enabling a suction to be created in said holder to draw in the electrolyte, a syringe for causing the suction, metallic members located in the holder, and means for passing an electric current through said members to measure the resistance of the electrolyte, when it is drawn into said holder.

3. In a device of the class described, the combination with a stomach tube, of a perforated nozzle on the end thereof, adapted for insertion into the stomach, and receiving the stomach contents, an electric circuit including separated members located in the nozzle, and conductors leading to the said members, whereby an electric current may be passed through the stomach contents to measure the resistance.

4. The combination of an apertured nozzle, a flexible tube attached thereto for causing a suction so that when the nozzle is introduced into the stomach the stomach contents will enter the nozzle, electrical plates in said nozzle separated from each other, a second flexible tube covering the first one telescopically and attached to the nozzle, and electrical conductors connecting with the plates and extending between the two tubes.

5. The combination of an apertured nozzle, a flexible tube attached thereto for causing a suction so that the stomach contents when the nozzle is introduced into the stomach will enter the nozzle, electrical plates in said nozzle separated from each other, a second flexible tube covering the first one telescopically and attached to the nozzle, and electrical conductors connecting with the plates and extending between the two tubes, together with means for determining and reading the conductivity of the stomach contents as measured by the passage of the electric current through the same.

6. In a device of the class described, the combination with a stomach tube, a perforated bulb carried thereby and insertable into the contents of the stomach, and an electric circuit arranged with separated poles in said bulb, so that a current may be passed through the stomach contents that are inside the bulb to measure their conductivity.

In testimony whereof I hereunto affix my signature.

HENRY PETER MAUE, M. D.